J. A. & F. I. KIRCHNER.

NECKSCARF.

No. 10,830. Reissued Apr. 26, 1887.

Witnesses

Wm. H. Jones,

Alex. Scott

Inventor.

Frank I. & J. A. Kirchner by their attorney

James R. Bakewell

N. PETERS, Photo-Lithographer, Washington, D. C.

UNITED STATES PATENT OFFICE.

JOSEPH A. KIRCHNER AND FRANK I. KIRCHNER, OF ALLEGHENY, PA.

NECKSCARF.

SPECIFICATION forming part of Reissued Letters Patent No. 10,830, dated April 26, 1887.

Original No. 309,719, dated December 23, 1884. Application for reissue filed February 3, 1885. Serial No. 154,844.

*To all whom it may concern:*

Be it known that we, JOSEPH A. KIRCHNER and FRANK I. KIRCHNER, of Allegheny city, in the county of Allegheny and State of Pennsylvania, have invented a new and useful Improvement in Neckscarfs; and we do hereby declare the following to be a full, clear, and exact description thereof, reference being had to the accompanying drawings, forming a part of this specification, in which—

Figure 1:
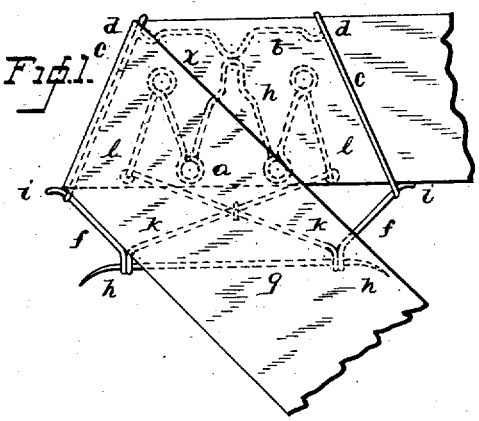
Figure 2:
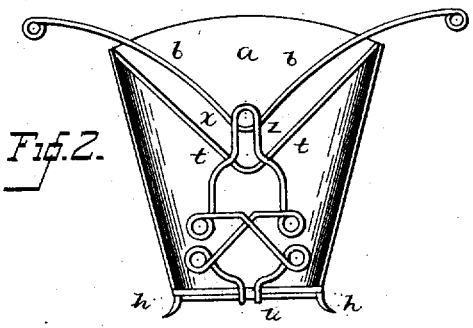
Figure 3:
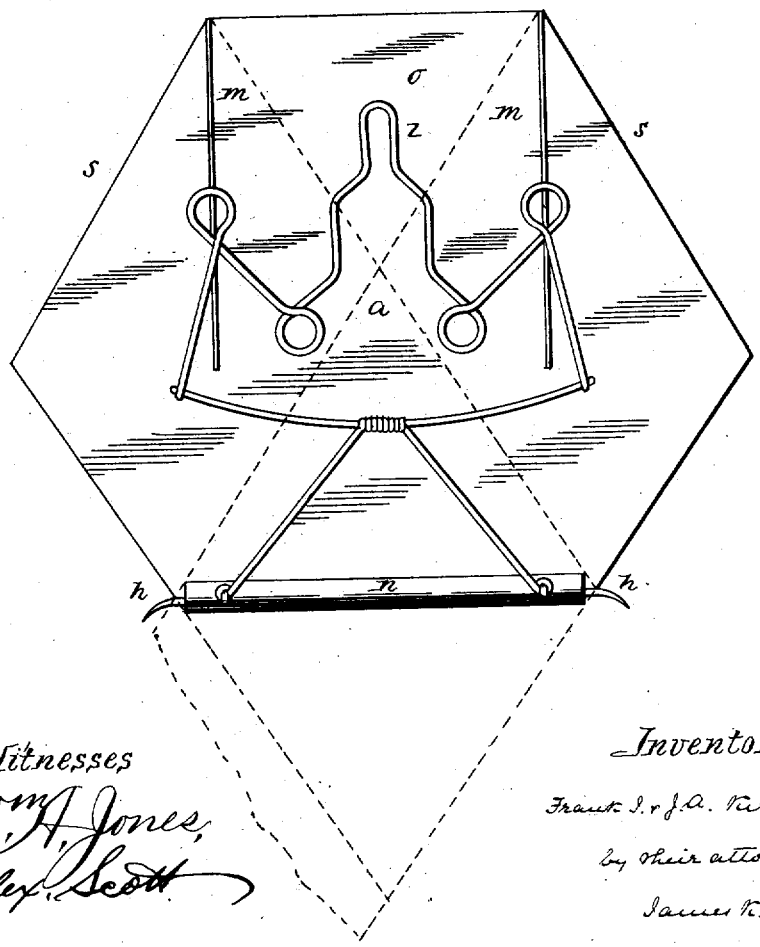

Figure 1 is a front view showing frame and the spring-loop hinged thereto and the fabric partially folded thereon, and Figs. 2 and 3 are rear views of modified forms of the same.

Like letters of reference indicate like parts wherever they occur.

Our invention relates to the construction of that class of frames or foundations for scarfs, neckties, &c., wherein the fabric is folded and detachably attached to the frame, so as to be readily removed and replaced for washing the fabric or renewing the same. It has for its object to provide a frame having in itself all the elements requisite for securely holding the fabric upon or to the frame without the necessity of sewing or confining the fabric by extraneous means.

To this end it consists, mainly, in a frame or foundation having knot-loops to confine the middle portion or body of the fabric composing the scarf or knot, and a needle or needles to confine the free end or ends of the knot fabric, and, secondarily, in details of construction, all as will hereinafter more fully appear.

We will now proceed to describe our invention more fully, so that others skilled in the art to which it appertains may apply the same.

This frame *a* should be formed in the general shape that it is desired the formed tie shall assume, and in Fig. 1 it is shown formed of wires bent and joined together, having an upper transverse bar, *b*, at the ends of which the side bars, *c*, are rigidly joined, these bars *c* extending upward slightly and then back on themselves, forming the open knot-loops *d d* at the two upper corners of the frame, and thence at an oblique angle from the bar *b* to the ends of the bars *f f*, to which they are united. These bars *f f* extend at an angle somewhat greater than a right angle to a point at or near the ends of the bottom bar, *g*, which is parallel to the top bar, *b*. At the ends of the bar *g* are formed sharp pins *h*, which are slightly curved, and also the upper ends of the bars *f f* project slightly above the meeting-point with the bars *c c*, forming blunt pins *i i*. Hinged to the bar *g* are the cross-bars *k k*, to the ends of which are hinged the wire *l*, which is bent so as to form three inverted V's, the middle one of which serves as a loop, which fits over the collar-button when the tie is worn, while the others and the cross-wires *k k* together form an elastic spring.

This frame may be transferred into a made or formed necktie or cravat from any loose scarf or piece of cloth, as follows: The cloth, being in width a little more than half the distance between the knot-loops *d* and the pins *i*, is placed back of the frame, the upper edge of the cloth coming under the knot-loops *d d*. The two ends of the cloth are then folded over the front of the frame and across each other, so that the lower edge of the cloth shall come above the pins *i i* and the upper edges of the ends of the cloth shall engage with the pins *h h* and be secured tightly on the frame thereby. The tie is then ready for use, and the cloth may be removed therefrom and a new covering substituted at pleasure. Although the frame alone may be employed, as described, the space between the bars may be filled with leather, card-board, or other material.

In Fig. 3 the frame is shown formed of card-board or other stiff material, in the upper part of which, extending from the upper edge longitudinally downward, are knot-loops, which are formed by making slits *m m* in the card-board frame. They are for the same purpose as the knot-loops *d d*, before described, and are equivalents thereof, in that they retain the cloth on the frame. At the lower edge of the frame is a metal binding, *n*, which secures the needles *h h*, and to which the spring-loop is hinged.

In forming the tie the cloth is placed on the front face of the portion *o* of the frame between the slits *m m*, the cloth passing through the slits to the rear face of the tie. The cloth is then folded over the edges *s s* and carried over the face of the frame to the pins *h h*, as in the form of frame shown in Fig. 1.

In Fig. 2 the frame is formed in the shape of a convex shield of sheet metal or other suitable material, and on the rear or concave side is a V-shaped bar, *t*, the ends of which are attached to the upper corners of the shield. At the lower corners of the shield are the securing-pins *h*, extending between which is a wire bar, *u*, to which the spring-loop is hinged. The cloth, which is in width equal to the length of the shield, is folded over the face of the shield and secured at its lower edge by the pins *h h*. The ends of the cloth are then passed back of the shield above the bar *t*, and thence down between the bar *t* and the rear face of the shield.

The upper bar, *b*, as shown in Figs. 1 and 2, may be bent so as to form an open loop or V, *x*, which shall engage under the collar-button, while the spring-loop *z* engages over the button, and thereby the tie, when worn, is kept in its proper position.

The advantages of our invention are that the tie is formed rapidly and with ease from any piece of cloth, and that the cloth, when it becomes worn or dirty, is easily removed and another piece substituted therefor.

In each of these frames (shown in Figs. 1, 2, and 3) the frame is provided with a device which prevents the cloth slipping off of the frame, which device is designated by the generic term "knot-loop," and also needle-points situated at the lower corners of the frame, the purpose of which is to enable the cloth to be secured without knotting or sewing.

Having thus described our invention, what we claim, and desire to secure by Letters Patent, is—

1. A frame or foundation for neck-wear, having knot-loops above and needle-points below the knot-loops for securing the knot fabric, substantially as and for the purposes specified.

2. A frame or foundation for neck-wear, having knot-loops above, needle-points below the knot-loops for securing the knot fabric, and a spring button-loop pivoted on the frame, substantially as and for the purposes specified.

3. A wire frame or foundation for neck-wear, having its sides bent into knot-loops and its transverse base-bar needle-pointed at the extremities, substantially as and for the purposes specified.

In witness whereof we have hereunto set our hands this 9th day of January, 1885.

JOSEPH A. KIRCHNER.
FRANK I. KIRCHNER.

Witnesses:
THOMAS W. BAKEWELL,
W. B. CORWIN.